United States Patent [19]

Sih

[11] Patent Number: 5,675,644
[45] Date of Patent: Oct. 7, 1997

[54] METHOD AND APPARATUS FOR CANCELING ECHO ACCOUNTING FOR DELAY VARIATIONS

[75] Inventor: Gilbert C. Sih, San Diego, Calif.

[73] Assignee: Qualcomm Incorporated, San Diego, Calif.

[21] Appl. No.: 533,883

[22] Filed: Sep. 26, 1995

[51] Int. Cl.[6] .................. H04B 3/20; H04M 9/00
[52] U.S. Cl. .................. 379/410; 379/3; 379/406; 370/32.1
[58] Field of Search .................. 379/410, 411, 379/406, 3; 370/32.1

[56] References Cited

U.S. PATENT DOCUMENTS

| | | | |
|---|---|---|---|
| 3,721,777 | 3/1973 | Thomas | 379/410 |
| 4,577,309 | 3/1986 | Barazeche et al. | 370/32.1 X |
| 4,587,382 | 5/1986 | Yang | 370/32.1 |
| 4,652,880 | 3/1987 | Moeller et al. | 342/373 |
| 4,697,261 | 9/1987 | Wang et al. | 370/32.1 |
| 4,712,235 | 12/1987 | Jones, Jr. | 379/410 |
| 4,736,414 | 4/1988 | Montagna et al. | 370/32.1 X |
| 4,751,730 | 6/1988 | Galand et al. | 379/410 |
| 4,764,955 | 8/1988 | Galand et al. | 379/411 |
| 4,782,525 | 11/1988 | Sylvain et al. | 379/410 |
| 4,823,342 | 4/1989 | Morita et al. | 370/109 |
| 4,827,472 | 5/1989 | Ferrieu | 370/32.1 |
| 4,903,247 | 2/1990 | Van Gerwen et al. | 367/135 |
| 4,912,758 | 3/1990 | Arbel | 379/388 |
| 4,947,425 | 8/1990 | Grizmala et al. | 379/410 |
| 4,987,569 | 1/1991 | Ling et al. | 370/32.1 |
| 4,995,030 | 2/1991 | Helf | 370/32.1 |
| 5,014,263 | 5/1991 | Vairavan et al. | 370/32.1 |
| 5,021,801 | 6/1991 | Smith et al. | 343/876 |
| 5,048,116 | 9/1991 | Schaeffer | 455/33 |
| 5,062,102 | 10/1991 | Taguchi | 370/32.1 |
| 5,084,865 | 1/1992 | Koike | 370/32.1 |
| 5,084,866 | 1/1992 | Buttle | 370/32.1 |
| 5,109,533 | 4/1992 | Mine et al. | 455/63 |
| 5,111,481 | 5/1992 | Chen et al. | 375/14 |
| 5,193,112 | 3/1993 | Sano | 379/410 |
| 5,195,132 | 3/1993 | Bowker et al. | 379/410 |
| 5,237,562 | 8/1993 | Fujii et al. | 370/32.1 |
| 5,239,542 | 8/1993 | Breidenstein et al. | 370/79 |
| 5,263,019 | 11/1993 | Chu | 370/32.1 |
| 5,263,020 | 11/1993 | Yatsuzuka et al. | 370/32.1 |
| 5,276,907 | 1/1994 | Meidan | 455/33.3 |
| 5,278,900 | 1/1994 | Van Gerwen et al. | 379/410 |
| 5,307,405 | 4/1994 | Sih | 379/410 |
| 5,313,498 | 5/1994 | Sano | 370/32.1 X |
| 5,337,366 | 8/1994 | Eguchi et al. | 281/71 |
| 5,343,173 | 8/1994 | Balodis et al. | 333/126 |
| 5,343,521 | 8/1994 | Jullien et al. | 379/410 |
| 5,343,522 | 8/1994 | Yatrou et al. | 379/410 |
| 5,351,291 | 9/1994 | Menez et al. | 379/410 |
| 5,363,401 | 11/1994 | Lucas et al. | 375/1 |
| 5,410,595 | 4/1995 | Park et al. | 379/410 |
| 5,414,766 | 5/1995 | Cannalire et al. | 379/410 |
| 5,455,819 | 10/1995 | Sugiyama | 379/3 X |

FOREIGN PATENT DOCUMENTS

| | | | |
|---|---|---|---|
| 3-127518 | 5/1991 | Japan | 379/410 |
| 9210074 | 11/1992 | WIPO | H04B 7/26 |

OTHER PUBLICATIONS

"A Spectrum Efficient Cellular Base–Station Antenna Architecture", Sixth International Conference On Mobile Radio and Personal Communications, S. C. Swales et al., pp. 272–279, Conference Publication No. 351, date unknown.

(List continued on next page.)

*Primary Examiner*—Krista M. Zele
*Assistant Examiner*—Devendra T. Kumar
*Attorney, Agent, or Firm*—Russell B. Miller; Sean English

[57] ABSTRACT

A method and apparatus for detecting and correcting for variations in the flat delay, which permits smooth echo canceller operation even under dynamic delay conditions. In a delay monitor, the received signal is compared against delayed versions of the echo estimate to determine whether a shift in the echo delay has occurred. If such a shift in delay has occurred then a signal indicating the amount of the shift is to the adaptive filter of the echo canceller and the filter taps are updated in accordance with the delay shift value.

18 Claims, 2 Drawing Sheets

OTHER PUBLICATIONS

"Multi–Beam Adaptive Base–Station Antennas for Cellular Land Mobile Radio Sytems", 39th IEEE Vehicular Technology Conference, S. C. Swales et al., vol. I, May 1–3, 1989, San Francisco, California, pp. 341–348.

"Smart Antenna Module", Northern Telecom Inc., Oct. 5, 1993, 4 pgs.

"PCS 1900 Advanced Services Generating Revenue for PCS Providers", Northern Telecom Inc., Sep., 1993, 13 pgs.

"Silencing Echoes on the Telephone Network", *Proceeding of the IEEE*, Man Mohan Sondhi et al., vol. 68, No. 8, Aug. 1980, pp. 948–963.

"A Fast Adaptive Echo Cancelar with Delay Estimation for Time Variant Telephone Circuits", *IEEE*, R. Montagna et al., 1984, pp. 48.6.1–48.6.6.

"An Adaptive Digital Filter as a Sinusoidal Noise Caneller", *The Transactions of the Institute of Electronics and Communication Engineers of Japan*, Takashi Ohmuro et al., vol. J64–A, No. 9, Sep. 1981, 37 pgs.

"Performance Analysis of Time Domain Block LMS Algorithms", *IEEE*, Luke S.L. Hsieh et al., 1993, pp. (III)535–538.

"The Block–Processing FTF Adaptive Algorithm", *IEEE Transactions on Acoustics, Speech, and Signal Processing*, John M. Cioffi, vol. Assp–34, No. 1, Feb. 1986, pp. 77–90.

"A Double Talk Detection Method for a Echo Canceller", S. Minami et al., pp. 46.5.1–46.5.6, date unknown.

"Echo Cancellation in Speech and Data Transmission", IEEE Journal on Selected Areas in Communications, David G. Messerchmitt, vol. Sca–2, No. 2, mar. 1984, pp. 283–297.

"Electronics Letters", 12th May 1988 vol. 24, No. 10, pp. 602–603.

Duttweiler, Donald L., "Subsampling to Estimate Delay with Application to Echo Cancelling", IEEE Trans. ASSP, vol. ASSP–31, No. 5, Oct. 1983, pp. 1090–1099 Oct. 1983.

Yip, Philip C. et al., "An Adaptive Technique for Multiple Echo Cancelation in Telephone Networks", Proceedings of ICASSP 1987, Apr. 6–9, 1987, vol. 4, pp. 2133–2136 Apr. 1987.

"Echo Canceller with Analog Flat Delay", IBM Technical Disclosure Bulletin, vol. 27, No. 10A, Mar. 1985.

METHOD AND APPARATUS FOR CANCELING ECHO ACCOUNTING FOR DELAY VARIATIONS

BACKGROUND OF THE INVENTION

I. Field of the Invention

The present invention relates to communication systems. More particularly, the present invention relates to a novel and improved method and apparatus for canceling echoes accounting for delay variations in the communications link.

II. Description of the Related Art

Communication systems require the use of echo cancellers for a variety of reasons. One cause of echo in telephone networks is due to the use of a device that interfaces the two-wire and four-wire segments known as a hybrid. A typical long-distance telephone circuit can be described as being two-wire in the subscriber loop to the local hybrid, four-wire over the long-haul network to the distant hybrid, and then two-wire to the distant speaker.

Although the use of hybrids facilitates long distance speech transmission, impedance mismatches at the hybrid cause echoes. The speech of the speaker A is reflected off the distant hybrid (the hybrid closest to speaker B) in the telephone network back toward speaker A, causing speaker A to hear an annoying echo of his/her own voice. Network echo cancellers are used in the land-based telephone network to eliminate echoes caused by impedance mismatches at the hybrids and are typically located in the central office along with the hybrid. The echo canceller located closest to speaker A or B is used to cancel the echo caused by the hybrid at the other end of the call. An example of a method and apparatus for canceling network echo is described in detail in U.S. Pat. No. 5,307,405, entitled "NETWORK ECHO CANCELLER", assigned to the assignee of the present invention and is incorporated by reference herein.

The performance of an echo canceller can be improved by inhibiting the update of its filter taps when both speakers A and B are simultaneously speaking. An example of a method and apparatus for detecting a doubletalk condition is described in detail in copending U.S. patent application Ser. No. 08/202,521, filed Feb. 28, 1994, entitled "DOUBLE-TALK DETECTION BY MEANS OF SPECTRAL CONTENT", assigned to the assignee of the present invention and is incorporated by reference herein.

Another type of echo is acoustic echo wherein the signal transmitted from a loudspeaker is picked up by a collocated microphone. This acoustic echo, which commonly occurs in hands-free mobile telephone calls, can be removed using an acoustic echo canceller. The performance and operation of both network echo cancellers and acoustic echo cancellers may be improved by the methods described herein.

In normal operation, a network echo canceller expects a fixed round-trip delay, referred herein as the flat delay, between the canceller and the hybrid. However, this flat delay can change during a call, for several reasons, the two most prevalent reasons being call re-routing and sample slipping. When this delay changes, the echo canceller can no longer remove the echo, causing an audible echo until the canceller readapts to the new channel.

SUMMARY OF THE INVENTION

The present invention is a novel and improved method and apparatus for detecting and correcting variations in the flat delay. This permits smooth echo canceller operation even under dynamic delay conditions. In the present invention, a received signal at the echo canceller is compared against time shifted versions of the echo estimate generated by the echo canceller to determine whether a shift in the echo delay has occurred. If such a shift has occurred, then a signal indicating the amount of the shift is provided to the adaptive filter of the echo canceller and the filter taps are updated in accordance with the delay shift value.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Network echo cancellers are used in the land-based telephone network to eliminate echoes caused by impedance mismatches at the 2-to-4 wire conversions, or hybrids. The speech of the far-end talker is reflected off the distant hybrid in the telephone network, causing the far-end talker to hear an annoying echo of his/her own voice.

Figure 1:
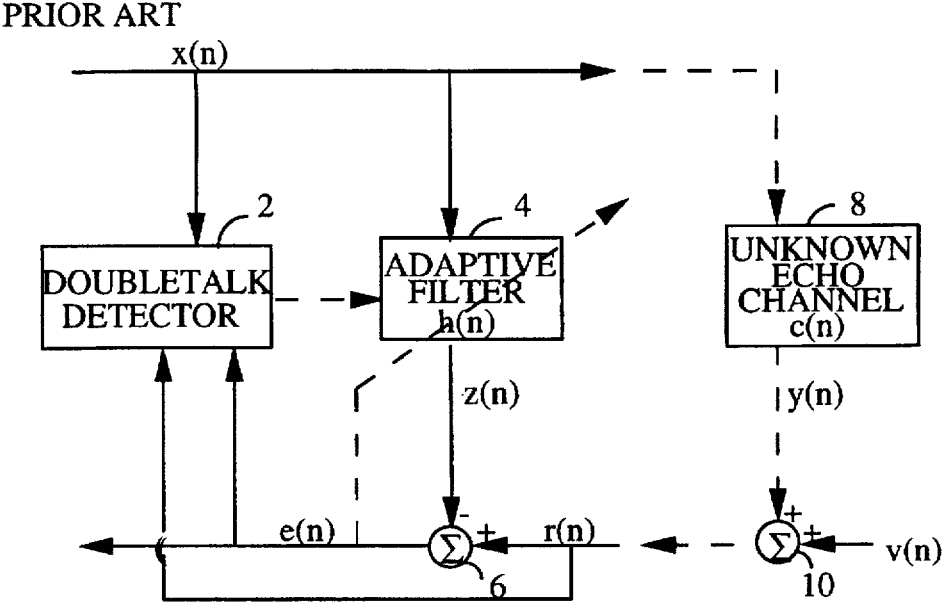
FIG. 1 is a block diagram of a traditional echo canceling system.

A block diagram of a traditional echo canceller is shown below in FIG. 1, where the hybrid has been modeled using unknown echo channel 8 and summing element 10. It should be noted that unknown echo channel 8 and summing element 10 are not elements of the communication system, but rather are simply artifacts of the non-ideal nature of the communication system.

The far-end signal x(n) passes through echo channel 8 to produce echo y(n), which is mixed with near-end speech v(n) in summing element 10 to produce received signal r(n). Adaptive filter 4 uses far-end signal x(n) as a reference signal to produce echo estimate z(n), which is subtracted from r(n) in summing element 6 to produce residual error signal e(n). This error signal is then used by adaptive filter 4 to update its taps h(n) according to some adaptation algorithm such as the Least-Mean Square (LMS) method, which is well known in the art and described in detail in the aforementioned U.S. Pat. No. 5,307,405. In essence, adaptive filter 4 learns the impulse response of unknown echo channel 8 by observing its response to the far-end signal x(n).

Doubletalk detector 2 monitors x(n), r(n), and e(n) to determine when the filter taps of adaptive filter 4 should be updated. Typically, when the talkers at both end of the communication link are speaking simultaneously, update of the filter taps of adaptive filter 4 is inhibited. The design and implementation of doubletalk detector 2 is well known in the art.

Figure 2:
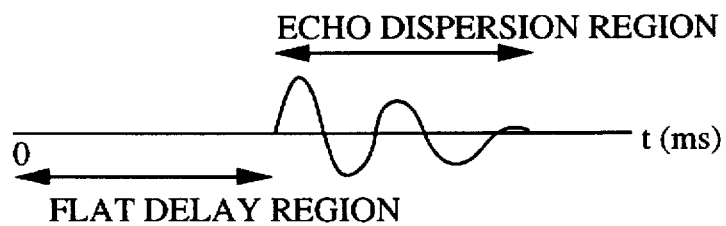
FIG. 2 is an illustration of a flat delay and echo dispersion region of an echo signal.

The echo channel impulse response can be decomposed into two sections, as shown in FIG. 2. The flat delay region, where the response is nearly zero, is caused by the round-trip time for the far-end speech to reflect off the remote hybrid and return to the echo canceller. The echo dispersion region, where the response is significant, is the actual echo created by the reflection off the hybrid. If the echo channel estimate generated by the adaptive filter exactly matches the true echo channel, the echo will be completely canceled.

There are several factors that can cause a change in the flat delay. Timing slips, in which a sample is added or dropped, can occur due to clock speed variations in time-multiplexed pulse code modulation (PCM) bit streams. Dynamic re-routing of a call while in the conversation state will also change the flat delay, since the PCM samples are re-routed along a different physical path. A dynamically changing transmission path, which might occur in a satellite link for example, will also cause dynamic flat-delay variations.

When the flat delay changes, the echo canceller can no longer remove the echo because its filter taps are not properly aligned to the new time relationship between x(n) and r(n). As a result, the far-end talker will hear echo until the canceller re-adapts to the new channel conditions.

One method for detecting a delay variation is to filter successively shifted versions of x(n) and subtract them from r(n). However, this method is computationally intensive. The present invention provides a method which is simpler because it does not require any additional filtering.

Figure 3:
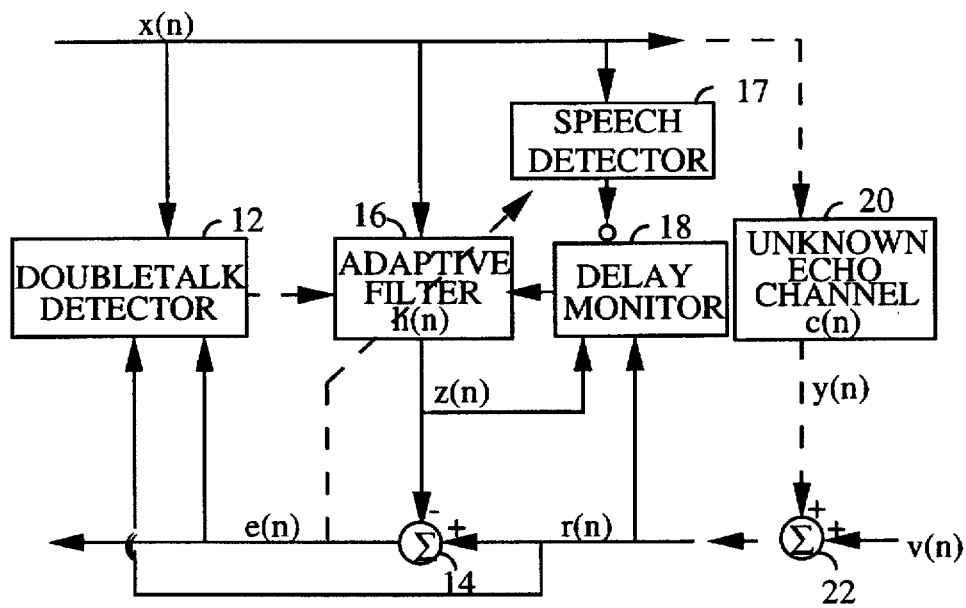
FIG. 3 is a block diagram of the echo canceling system of the present invention incorporating a delay monitor.

Referring to FIG. 3, to compensate for flat delay variations, the present invention introduces delay monitor 18. In the exemplary embodiment, delay monitor 18 is implemented in a microprocessor or digital signal processor programmed to provide the functions as described. The source of the echo has been modeled using unknown echo channel 20 and a summing element 22. As described above, unknown echo channel 20 and summing element 22 are not elements of the communication system, but rather are simply artifacts of the non-ideal nature of the communication system.

The far-end signal, x(n), passes through unknown echo channel 20 to produce an echo signal, y(n), which is mixed with near-end speech, v(n), in summing element 22 to produce the received signal, r(n). Adaptive filter 16 uses far-end signal x(n) as a reference signal to produce a echo estimate, z(n), which is subtracted from r(n) in summing element 14 to produce residual error signal e(n). This error signal is used by adaptive filter 16 to update its taps h(n) according to some adaptation algorithm such as the Least-Mean Square (LMS) method, which is well known in the art and described in detail in the aforementioned U.S. Pat. No. 5,307,405. As described above, adaptive filter 16 learns the impulse response of unknown echo channel 20 by observing its response to the far-end signal x(n). In the exemplary embodiment, adaptive filter 16 is implemented in a microprocessor or digital signal processor programmed to provide the functions as described.

Doubletalk detector 12 monitors x(n), r(n), and e(n) to determine when the filter taps of adaptive filter 16 should be updated. Typically, updating the filter tap values of adaptive filter 16 is inhibited when talkers at both ends of the communications link are speaking simultaneously. As stated above, the design and implementation of doubletalk detector 12 is well known in the art. In the exemplary embodiment, doubletalk detector 12 is implemented in a microprocessor or digital signal processor programmed to provide the functions as described.

Delay monitor 18 is enabled whenever the far-end talker is speaking. The speech of the far-end talker is detected by speech detector 17 which provides an enable signal to delay monitor 18, when far-end speech is present. In the exemplary embodiment, speech detector 17 determines the energy of the far-end signal and compares this energy to a set of dynamically changing threshold values. The implementation of such a speech detection system is described in detail in the U.S. Pat. No. 5,414,796, entitled "VARIABLE RATE VOCODER", assigned to the assignee of the present invention and incorporated by reference herein.

In the exemplary embodiment, delay monitor 18 uses the received signal, r(n), and the echo estimate, z(n), to detect changes in the flat delay by computing the residual energy values, E[i], given by the equation:

$$E[i] = \sum_{k=n-M+1}^{n} [r(k-i) - z(k)]^2 \quad (1)$$

E[i] is the energy of the filter residual over M samples if the flat delay was reduced by i samples, where a positive i indicates a reduction in the delay, and a negative i signifies an increase in the delay.

In normal operation, the residual energy E[0] will be small because signals r(n) and z(n) are time-aligned with each other. However, if the flat delay is suddenly reduced by 2 samples, then E[2] will be small, because it computes the residual energy for the proper time alignment between r(n) and z(n). Similarly, if the delay is suddenly increased by 1 sample, then E[−1] will be small. In both cases, the other values of E[i] will be relatively large, indicating an incorrect time alignment between r(n) and z(n).

Figure 4:
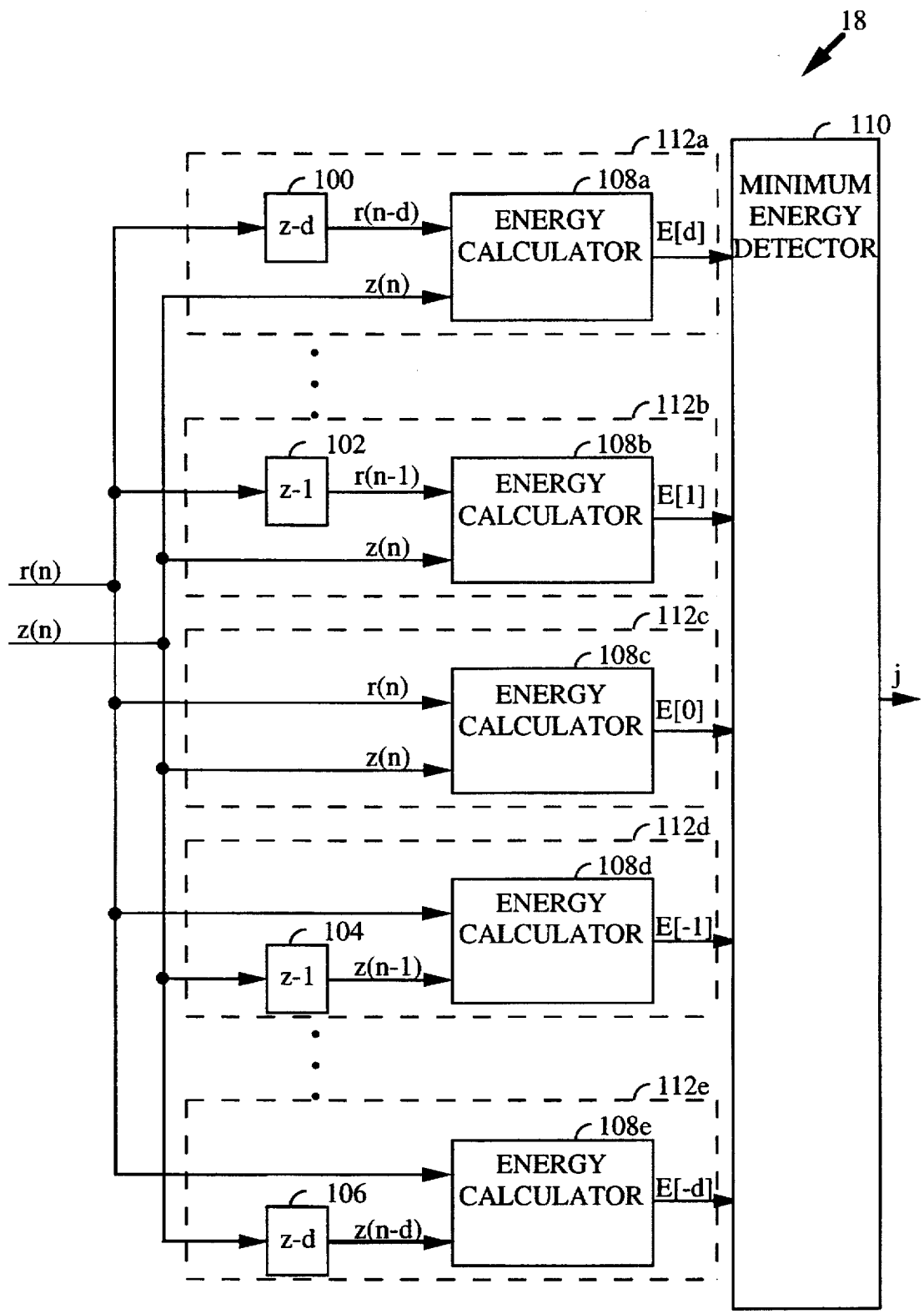
FIG. 4 is a block diagram of the delay monitor of the present invention.

Referring now to FIG. 4, if the range of flat delay variations is [−d, d], delay monitor 18 can detect the change in the flat delay by computing E[i], where i=−d, . . . −2, −1, 0, 1, 2, . . . , d as illustrated. If the present invention is implemented to account only for delay variations resulting from sample slipping, then a delay, d, of 1 or 2 samples would be generally be adequate. If the present invention is implemented to account for landline re-routing delay variations, then a delay, d, of up to 10 samples may be necessary depending on the routing characteristics of the communication system. If the present invention is implemented to account for variations resulting from a moving satellite, then the delay, d, is selected in accordance with the speed of that satellite and can require more samples.

The received signal, r(n), and the echo estimate, z(n), are provided to delay monitor 18. In the exemplary embodiment, delay monitor 18 is implemented in a microprocessor or digital signal processor programmed to perform the functions as described. Delay monitor 18, in the exemplary embodiment, is comprised of a plurality of computation elements 112 and minimum energy detector 110.

Computation element 112a computes the residual energy value E[d] as described in equation 1 above. The received signal, r(n), is provided to delay element 100 which delays the received signal, r(n), by d samples before outputting it to energy calculator 108a. Delay element 100 can be implemented using a series of latches or a delay line, as is well known in the art. The estimated echo signal, z(n), is provided directly to energy calculator 108a and the residual energy is computed as described in equation 1 above and provides the computed residual energy value, E[d], to minimum energy detector 110.

It should be noted that if a range of delays, d, greater than two is desired then additional computation elements will be provided between computation element 112i aand 112b.

Computation element 112b computes the residual energy value E[1] as described in equation 1 above. The received signal, r(n), is provided to delay element 102 which delays the received signal, r(n), by 1 sample before outputting it to energy calculator 108b. Delay element 102 can be implemented using a series of latches or a delay line, as is well known in the art. The estimated echo signal, z(n), is provided directly to energy calculator 108b and the residual energy is computed as described in equation 1 above and provides the computed residual energy value, E[1], to minimum energy detector 110.

Computation element 112c computes the residual energy value E[0] as described in equation 1 above. The received signal, r(n), and the estimated echo signal, z(n), are provided directly to energy calculator 108c and the residual energy is computed as described in equation 1 above and provides the computed residual energy value, E[0], to minimum energy detector 110.

Computation element 112d computes the residual energy value E[−1] as described in equation 1 above. The estimated echo signal, z(n), is provided to delay element 104 which delays estimated echo signal, z(n), by 1 sample before outputting it to energy calculator 108d. Delay element 104 can be implemented using a series of latches or a delay line, as is well known in the art. The received, r(n), is provided directly to energy calculator 108d and the residual energy is computed as described in equation 1 above and provides the computed residual energy value, E[−1], to minimum energy detector 110.

It should be noted that if a range of delays, d, greater than two is desired then additional computation elements will be provided between computation element 112d and 112e.

Computation element 112e computes the residual energy value E[−d] as described in equation 1 above. The estimated echo signal, z(n), is provided to delay element 106 which delays estimated echo signal, z(n), by d samples before outputting it to energy calculator 108e. Delay element 106 can be implemented using a series of latches or a delay line, as is well known in the art. The received signal, r(n), is provided directly to energy calculator 108e and the residual energy is computed as described in equation 1 above and provides the computed residual energy value, E[−d], to minimum energy detector 110.

These computed residual energy values are computed and fed into minimum energy detector 110 every M samples, which finds the index j that corresponds to the smallest energy E[j]. That is, $$j=\{i|E[i]<E[k], k\epsilon[-d,d]\}. \qquad (2)$$

Delay monitor 18 then increments a counter for index j, and clears the counters for all the other indices. In this way, a counter can only be successively incremented if its index corresponds to the lowest energy in consecutive frames. If the counter for index j reaches a predetermined threshold, the delay monitor sends a tapshift indication to the adaptive filter 16 to notify if that the flat delay has changed.

Adaptive filter 16 then shifts its taps to compensate for the delay change. If j>0, the flat delay has been decreased by j samples so the filter taps are shifted left j positions as follows:

$$h'(n) = \begin{cases} h(n+j)n & = 0,1\ldots N-1-j \\ 0 & \text{else} \end{cases} \qquad (3)$$

Similarly, if j<0, the flat delay has been increased by j samples, so the filter taps are shifted right by j positions as follows:

$$h'(n) = \begin{cases} h(n-|j|)n & = |j|,|j|+1|,\ldots,N-1 \\ 0 & \text{else} \end{cases} \qquad (4)$$

Alternatively, a pointer to either the index of the received signal, r(n), or to the tap values, h(n), could be moved in response to compensate for the delay change. The use of delay monitor 18 permits the echo canceller to quickly account for dynamic delay variations and provide smooth, uninterrupted echo cancellation.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An echo canceller comprising:

delay monitor means for receiving an echo estimate signal and a received signal and for monitoring an echo flat delay and providing a delay signal indicative of said monitored echo flat delay; and adaptive filter means for generating an echo estimate responsive to said delay signal.

2. The apparatus of claim 1 wherein said delay monitor means comprises:

delay means for receiving said received signal and said echo estimate and delaying said received signal and said echo estimate by a delay according to a predetermined delay format; and residual energy computation means for receiving said delayed received signal and said delayed echo estimate and for computing a plurality of residual energy values.

3. The apparatus of claim 2 further comprising selection means for receiving said plurality of residual energy values and for selecting a minimum residual energy value.

4. The apparatus of claim 2 wherein said delay means comprises:

at least one echo estimate delay subsystems wherein each of said echo estimate delay subsystems is for receiving said echo estimate and for delaying said echo estimate by a predetermined delay period; and at least one received signal delay subsystems wherein each of said received signal delay subsystems is for receiving said received signal and for delaying said received signal by a predetermined delay period.

5. The apparatus of claim 2 wherein said residual energy computation means computes said residual energy values, E[i], in accordance with the equation:

$$E[i] = \sum_{k=n-M+1}^{n} [r(k-i) - z(k)]^2,$$

wherein r(k) refers to the samples of said received signal and z(k) refers to the samples of said echo estimate signal.

6. The apparatus of claim 1 wherein said adaptive filter adapts at least one tap value in accordance with the equation:

$$h'(n) = \begin{cases} h(n+j)n & = 0,1\ldots N-1-j \\ 0 & \text{else} \end{cases},$$

wherein j is an index referring to said echo flat delay.

7. The apparatus of claim 1 further comprising speech detection means for detecting the presence of a far-end signal.

8. A method for echo cancellation comprising the steps of:

monitoring an echo flat delay based upon a received signal and an echo estimate signal;

providing a delay signal indicative of said monitored echo flat delay; and generating an echo estimate responsive to said delay signal.

9. The method of claim 8 wherein said echo estimate is generated by an adaptive filter which adapts at least one tap value in accordance with the equation:

$$h'(n) = \begin{cases} h(n+j) & n = 0, 1 \ldots N-1-j \\ 0 & \text{else} \end{cases},$$

wherein j is an index referring to said echo flat delay.

10. The method of claim 8 further comprising the step of detecting the presence of a far-end signal.

11. The method of claim 8 wherein said step of monitoring an echo flat delay comprises the steps of:

delaying said received signal and said echo estimate by a delay according to a predetermined delay format; and computing a plurality of residual energy values.

12. The method of claim 11 further comprising the step of selecting a minimum residual energy value.

13. The method of claim 11 wherein said step of delaying said received signal and said echo estimate comprises:

delaying said echo estimate by a predetermined delay period; and delaying said received signal by a predetermined delay period.

14. The method of claim 11 wherein said step of computing a plurality of residual energy values computes said residual energy values, E[i], in accordance with the equation:

$$E[i] = \sum_{k=n-M+1}^{n} [r(k-i) - z(k)]^2,$$

wherein r(k) refer the samples of said received signal and z(k) refers to the samples of said echo estimate signal.

15. An echo canceller comprising:

delay monitor having a first input for receiving a received signal and having a second input for receiving an echo estimate signal and having an output; and adaptive filter means having an input coupled to said delay monitor output and having an output.

16. The apparatus of claim 15 wherein said delay monitor has a third input for receiving a far-end speech detection signal.

17. The apparatus of claim 16 further comprising a speech detector having an input for receiving a far-end signal and having an output coupled to said delay monitor third input.

18. The apparatus of claim 15 further comprising a double talk detector having a first input for receiving said received signal and having a second input for receiving said far-end signal and having an output coupled to a second input of said adaptive filter.

* * * * *